United States Patent
Doki et al.

(10) Patent No.: US 6,750,287 B2
(45) Date of Patent: Jun. 15, 2004

(54) POLYOXYMETHYLENE RESIN COMPOSITION

(75) Inventors: Makoto Doki, Sodegaura (JP); Hideki Nakamura, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 35 days.

(21) Appl. No.: 10/024,203

(22) Filed: Dec. 21, 2001

(65) Prior Publication Data

US 2002/0115790 A1 Aug. 22, 2002

(30) Foreign Application Priority Data

Dec. 27, 2000 (JP) ........................................ 2000-398380

(51) Int. Cl.[7] ............................................... C08L 59/04
(52) U.S. Cl. ..................... 525/88; 525/92 R; 525/92 H; 525/92 L; 525/100; 525/328.2
(58) Field of Search ................................. 525/88, 92 R, 525/92 H, 92 L, 100, 328.2

(56) References Cited

U.S. PATENT DOCUMENTS 5,278,246 A * 1/1994 Shiraki et al. ............... 525/301
5,886,094 A * 3/1999 Sanada et al. ................ 525/66

FOREIGN PATENT DOCUMENTS

| JP | 8-165405 A | 6/1996 |
| JP | 10-060224 A | 3/1998 |

* cited by examiner

*Primary Examiner*—Jeffrey Mullis
(74) *Attorney, Agent, or Firm*—Birch, Stewart, Kolasch & Birch, LLP

(57) ABSTRACT

Provided is a polyoxymethylene resin composition which comprises (I) 100 parts by weight of a polyoxymethylene polymer and (II) 1–200 parts by weight of a thermoplastic elastomer having a main dispersion peak temperature of −30° C. to +50° C. in a tan δ curve obtained by the measurement of viscoelasticity and having a number average molecular weight of 10,000–500,000. Since moldings obtained from this resin composition simultaneously satisfy both the good frictional wear characteristics and the high vibration damping performances, they can be suitably employed for the uses such as vibration-proof sliding components in the fields of precision machines, OA appliances and automobiles.

15 Claims, No Drawings

POLYOXYMETHYLENE RESIN COMPOSITION

BACKGROUND OF THE INVENTION

The present invention relates to a polyoxymethylene resin composition, and a molding obtained from the composition. The molding comprising the polyoxymethylene resin composition of the present invention have both the excellent frictional wear characteristics and the very high vibration damping properties, and, hence, is suitably usable as materials of vibration-proof sliding components in the fields of precision machines, OA appliances and automobiles.

Hitherto, polyoxymethylene resins have been widely used for various mechanical working components, OA appliances, etc. as engineering resins having excellent mechanical characteristics and heat resistance characteristics. This is especially found in the moldings comprising polyoxymethylene resins, which have excellent frictional wear characteristics, and have been suitably used as gear materials of printers, etc. However, with recent enhancements in precision and function of apparatuses, the reduction in vibration and noise generated by the apparatuses is an important task, and a higher vibration damping ability is now required for material resins.

In general, as vibration dampers, rubbers or thermoplastic elastomers, or resins or rubbers sandwiched between metal sheets have been used. However, the rubbers or thermoplastic elastomers have insufficient heat resistance under high temperature conditions caused by the generation of heat, and furthermore they have frictional wear problems when used against metals and resins, and chemical resistance problems when contacted with chemicals such as ink. On the other hand, resins or rubbers sandwiched between metal sheets have a problem in molding processability.

JP-A-8-165405 discloses a polymer composition obtained by polymerizing formaldehyde in the presence of a block copolymer of a specific vinyl aromatic compound, and JP-A-10-60224 discloses a mixture of a polyoxymethylene polymer and a styrene resin having a functional group. However, both of these techniques aim at improving the impact resistance, and they do not suggest the present invention.

SUMMARY OF THE INVENTION

The present invention provides a polyoxymethylene resin composition to which a very high vibration damping ability is imparted without damaging the excellent frictional wear characteristics of the polyoxymethylene resin, and further provides moldings comprising the resin composition, particularly, mechanical working components such as gears, cams, sliders, levers, arms, clutches, joints, shafts, bearings, key stems, key tops, shutters, reels, etc.

The inventors have conducted intensive research in an attempt to provide a polyoxymethylene resin composition which can solve the above problems without sacrificing the characteristics inherent to the polyoxymethylene resins to the extent possible and which have excellent vibration damping properties. As a result, it has been found that a molding comprising a polyoxymethylene resin composition containing a polyoxymethylene polymer and a specific thermoplastic elastomer has both the superior frictional wear characteristics and a high vibration damping ability. Thus, the present invention has been accomplished.

That is, the present invention relates to a polyoxymethylene resin composition containing (I) 100 parts by weight of a polyoxymethylene polymer and (II) 1–200 parts by weight of a thermoplastic elastomer having a main dispersion peak temperature of −30° C. to +50° C. in a tan δ curve obtained by the measurement of viscoelasticity and having a number average molecular weight of 10,000–500,000.

The polyoxymethylene resin composition of the present invention may further contain (III) 0.1–30 parts by weight of a lubricant and/or (IV) 1–100 parts by weight of a polyolefinic resin based on 100 parts by weight of the polyoxymethylene polymer.

Furthermore, the present invention relates to a molding having a high vibration damping ability that is obtained by molding the above resin composition, particularly, a mechanical working component such as a gear, cam, slider, lever, arm, clutch, joint, shaft, bearing, key stem, key top, shutter, reel, or the like.

DETAILED DESCRIPTION OF THE INVENTION

The polyoxymethylene resin (I) used in the present invention includes homopolymers which are obtained by polymerizing formaldehyde or cyclic oligomers of formaldehyde such as trioxane as its trimer, tetraoxane as its tetramer, etc. and terminated with ether or ester groups at both ends of the polymer; oxymethylene copolymers which contain oxyalkylene units of 2–8 carbon atoms in an amount of 0.1–20 mole % based on the oxymethylene and which are obtained by copolymerizing formaldehyde, trioxane as its trimer or tetraoxane as its tetramer with ethylene oxide, propylene oxide, 1,3-dioxolane, formal of glycol, formal of diglycol, etc.; those which have branches of molecular chains; oxymethylene block polymers containing not less than 50% by weight of segments consisting of oxymethylene units and not more than 50% by weight of different segments; etc.

The above polyoxymethylene polymer preferably has a number average molecular weight of 10,000–500,000.

There are various methods for adjusting the molecular weight of the polyoxymethylene polymer. For example, water, an alcohol (e.g., methanol), an acid (e.g., formic acid), etc. can be chain transferred, or a polymer having at least one of hydroxyl group, carboxyl group, amino group, ester group, and alkoxy group can be chain transferred. Furthermore, if necessary, a formal such as methylal may be added simultaneously. In the present invention, it is preferred to use a polyoxymethylene block copolymer obtained by chain transferring a polymer having a number average molecular weight of not less than 400 and having at least one of hydroxyl group, carboxyl group, amino group, ester group, and alkoxy group.

Furthermore, as preferred polyoxymethylene polymers, mention may be made of polyoxymethylene copolymers (i-1) having oxymethylene groups as main recurring units and containing an oxyalkylene group of 2 or more carbon atoms in an amount of 0.1–5 mole %, more preferably 0.2–3 mole % based on the total oxymethylene groups.

Above all, especially preferred are polyoxymethylene block copolymers (i-2) represented by the following formula (1) which have a number average molecular weight of 10,000–500,000 and comprise a polyacetal segment and a hydrogenated polybutadiene segment hydroxyalkylated at both ends having a number average molecular weight of 500–10,000:

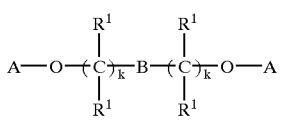

(1)

[where A is a polyacetal copolymer residue and comprises 95–99.9 mole % of oxymethylene units and 0.1–5 mole % of oxyalkylene units represented by the following formula (2):

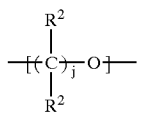

(2)

(where $R^2$ is independently selected from the group consisting of hydrogen, an alkyl group, a substituted alkyl group, an aryl group and a substituted aryl group, and j is an integer selected from 2 to 6), the terminal group being represented by the following formula (3):

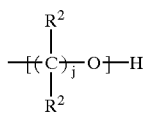

(3)

(where $R^2$ and j have the same meanings as defined above), B is a hydrogenated polybutadiene having an iodine value of 20 g-$I_2$/100 g or less and containing 2–98 mole % of 1,2-bonds and 2–98 mole % of 1,4-bonds, said 1,2-bonds and 1,4-bonds being present in the polymer chain either in random or in blocks, $R^1$ is independently selected from the group consisting of hydrogen, an alkyl group, a substituted alkyl group, an aryl group and a substituted aryl group, and k is an integer selected from 2 to 6 where two ks are the same or different from each other].

The above polyoxymethylene copolymer (i-1) and (i-2) can each be naturally used alone or in an optional combination, the weight ratio of (i-1)/(i-2) is preferably in the range of 0/100–95/5.

The polymerization process of the polyoxymethylene polymer has no special limitation, and an example is bulk polymerization, which may be a batch process or a continuous process. According to this bulk polymerization, generally, monomers in a molten state are used and solid bulky polymers are obtained as the polymerization progresses.

Polymerization catalysts are preferably cationically active catalysts such as Lewis acids, protonic acids and esters or anhydrides thereof, or the like. Of these catalysts, especially preferred are boron trifluoride; boron trifluoride hydrate; and coordination complex compounds of boron trifluoride and an organic compound containing an oxygen atom or a sulfur atom. Specifically, boron trifluoride diethyl ether and boron trifluoride di-n-butyl ether are suitable. The amount of the polymerization catalysts to be used is preferably $1 \times 10^{-6}$ to $1 \times 10^{-3}$ mole, more preferably $5 \times 10^{-6}$ to $1 \times 10^{-4}$ mole based on 1 mole of total monomer components such as trioxane and cyclic ether and/or cyclic formal.

The polymerization catalyst in the polyoxymethylene polymer is deactivated by introducing the polyoxymethylene polymer in an aqueous solution or organic solvent solution containing a catalyst neutralizing-deactivating agent such as an amine, a hydroxide, inorganic acid salt or organic acid salt of an alkali metal or an alkaline earth metal, or the like. Other methods for deactivation of catalysts are a method of contacting with a vapor such as ammonia, and the like.

An explanation will how be made of terminal stabilization treatment of the polyoxymethylene polymer after deactivation of the polymerization catalyst. Procedure for decomposing and removing the unstable terminal groups includes, for example, a procedure of decomposing and removing the unstable terminal groups by melting the polyoxymethylene polymer using a screw type extruder with a vent in the presence of a basic compound capable of decomposing the unstable terminal groups, such as aliphatic amines, hydroxides, inorganic weak acid salts, organic weak acid salts, etc. of alkali metals or alkaline earth metals. Especially preferable basic compounds are quaternary ammonium compounds represented by the following formula (4):

$$[R^3R^4R^5R^6N^+]_nX^{-n} \qquad (4)$$

where $R^3$, $R^4$, $R^5$ and $R^6$ independently represent an unsubstituted or substituted alkyl group having 1–30 carbon atoms; an aryl group having 6–20 carbon atoms; an aralkyl group consisting of an unsubstituted or substituted alkyl group having 1–30 carbon atoms with at least one aryl group having 6–20 carbon atoms as a substituent; or an alkylaryl group consisting of an aryl group having 6–20 carbon atoms with at least one unsubstituted or substituted alkyl group having 1–30 carbon atoms as a substituent; and the unsubstituted or substituted alkyl group is straight, branched or cyclic; the substituent of the substituted alkyl group is halogen, a hydroxyl group, an aldehyde group, a carboxyl group, an amino group or an amide group; hydrogen atom of the unsubstituted alkyl group, aryl group, aralkyl group and alkylaryl group may be substituted by halogen; n is an integer of 1–3; and X represents a hydroxyl group or a residue of carboxylic acid having 1–20 carbon atoms, a hydroacid, an oxoacid, an inorganic thio acid or an organic thio acid having 1–20 carbon atoms.

The quaternary ammonium compound is preferably a hydroxide or a salt of sulfuric acid, carbonic acid, boric acid or a carboxylic acid. The carboxylic acid is especially preferred to be formic acid, acetic acid or propionic acid.

These quaternary ammonium compounds may be each used alone or in combination of two or more. The amount of the quaternary ammonium compounds to be added is 0.05–50 ppm by weight in terms of the amount of nitrogen originating from the quaternary ammonium compound represented by the following formula (5) on the basis of the weight of the polyoxymethylene polymer:

$$P \times 14/Q \qquad (5)$$

where P shows an amount (ppm by weight) of the quaternary ammonium compound on the basis of the weight of the polyoxymethylene polymer; "14" shows the atomic weight of nitrogen; and Q shows the molecular weight of the quaternary ammonium compound.

The thermoplastic elastomer (II) used in the present invention will be explained below. The thermoplastic elastomer includes polyolefinic elastomers, styrenic elastomers, polyester-based elastomers, polyamide-based elastomers, polyurethane-based elastomers, etc. There are no special limitations in the forms of copolymerization such as random, block, graft, etc.; polymerization degree; presence or absence of side chains or branched chains and degree thereof; proportions of copolymerization components; presence or absence of hydrogenation; and the like.

In the present invention, it is necessary for the thermoplastic elastomer that a main dispersion peak temperature in a tan δ curve obtained by the measurement of viscoelasticity (which may be hereinafter referred to "tan δ peak temperature") is −30° C. to +50° C., more preferably −20° C. to +40° C. If the tan δ peak temperature is lower than −30° C. or higher than +50° C., a sufficient vibration damping ability cannot be obtained.

Furthermore, the number average molecular weight of the thermoplastic elastomer must be 10,000–500,000. If the number average molecular weight is outside the above range, a high vibration damping ability cannot be obtained.

Moreover, in the present invention, it is particularly preferred to use a thermoplastic elastomer having a tan δ of not less than 0.2 at room temperature of 23° C., in addition to the above-mentioned requirements.

In addition, in the present invention, it is also preferred to use a thermoplastic elastomer having a weight retention rate of not less than 75% at 350° C. in terms of a loss of weight caused by heat decomposition which is measured using a thermobalance at a heating rate of 10° C./min in a nitrogen stream.

In the present invention, it is preferred to use a styrenic elastomer comprising a vinyl aromatic monomer as the thermoplastic elastomer.

The thermoplastic elastomer is more preferably a copolymer of a styrene monomer and a monomer copolymerizable with the styrene monomer. The styrene monomer includes, for example, aromatic vinyl monomers such as styrene, α-methylstyrene, 2,4-dimethylstyrene, t-butylstyrene, chloromethylstyrene, ethylstyrene, etc., and styrene is preferred. The monomer copolymerizable with the styrene monomer includes elastomers, etc. in addition to copolymerizable unsaturated monomers. As the copolymerizable monomers, mention may be made of, for example, (meth) acrylonitriles, (meth)acrylates, maleimide monomers, diene monomers (e.g., butadiene, isoprene, etc.), olefins (e.g., ethylene, propylene, butene, etc.), and the like. Examples of the elastomer are polybutadiene, polyisoprene, ethylenepropylene rubber, acrylic rubber, halogenated polyolefins such as chlorinated polyethylene, etc., and they may be hydrogenated products.

As the thermoplastic elastomer, especially preferred are styrene elastomers which comprise a polymer segment (a) comprising a vinyl aromatic monomer having a number average molecular weight of not less than 2500 and a polymer segment (b) comprising isoprene or isoprene-butadiene and containing not less than 20%, preferably not less than 40% of vinyl bonds of 3,4- and 1,2-bonds. Moreover, these styrene elastomers preferably have at least two polymer segments (a).

When the above thermoplastic elastomer is used in an amount of 1–200 parts by weight, preferably 2–150 parts by weight, more preferably 5–120 parts by weight based on 100 parts by weight of the polyoxymethylene polymer as the component (I), the desired performances of the present invention can be exerted. If the amount of the thermoplastic elastomer is less than 1 part by weight or more than 200 parts by weight, good frictional wear characteristics and vibration damping properties cannot be satisfied simultaneously.

The vibration damping properties are determined by using a dumbbell molded test piece of 3.0 mm in thickness×13 mm in width×175 mm in length, and fixing one end thereof and measuring a sound which is emitted when the root of the fixed end is struck by an impulse hammer, thereby obtaining a frequency response function between vibration force signals of hammer and sound pressure signals of microphone by an acoustic analysis system. A difference in sound pressure level between resonance peak and antiresonance peak of the frequency response function is measured, and the smaller value means better vibration damping characteristics. In this specification, the vibration damping properties are defined to be difference in sound pressure peak in the above-mentioned evaluation method.

The resin composition of the present invention may further contain (III) a lubricant in addition to the components (I) and (II). The lubricant as the component (III) includes, for example, silicone-grafted polyolefinic resins, silicone compounds and/or alkylene glycol copolymers having a number average molecular weight of 100–5000, and liquid ethylene-α-olefin random copolymers. Above all, the silicone-grafted polyolefinic resins are preferred.

The silicone-grafted polyolefinic resin is at least one polyolefinic resin selected from, for example, low density polyethylene, linear low density polyethylene, high density polyethylene, ethylene-vinyl acetate copolymer, ethylene-methyl methacrylate copolymer, ethylene-ethyl acrylate copolymer, polymethylpentene, polypropylene, and tetrafluoroethylene-ethylene copolymer (which may contain a small amount of vinyl monomers such as vinyl acetate, if required) grafted with a silicone compound represented by the following formula (6), such as polydimethylsiloxane, etc.:

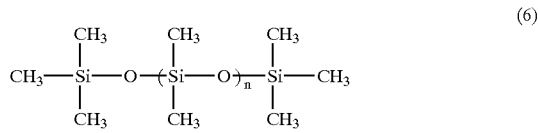

(6)

In the formula (6), the methyl group may be substituted by hydrogen, an alkyl group, a phenyl group, an ether group or an ester group, or a substituent group containing a hydroxy group, an amino group, an epoxy group, a carboxyl group, a carbinol group, a polyether group, a methacryl group, a mercapto group, a phenol group, a vinyl group, an allyl group, a fluorine-containing alkyl group or the like as a reactive substituent group, where a substituent group containing a vinyl group or an allyl group, with the vinyl group being more prefered for grafting.

An average polymerization degree n of the silicone compound is preferably 1,000 to 10,000. In case the average polymerization degree n is less than 1,000 or more than 10,000, the frictional wear characteristics and durability sometimes become insufficient.

The silicone-grafted polyolefinic resin can be produced by melt kneading a polyolefinic resin and a silicone compound at a specific temperature and a specific shear condition as described in U.S. Pat. No. 3,865,897. Similar technologies are disclosed in U.S. Pat. No. 4,252,915 and JP-A-1-230652. More preferably, the content of cyclic low molecular monomers and oligomers in these silicone compounds are as small as possible from the viewpoint of electrical contact contamination resistance.

The amount of the lubricant to be added is preferably 0.1–30 parts by weight, more preferably 1–20 parts by weight based on 100 parts by weight of the polyoxymethylene polymer. If the amount is less than 0.1 part by weight or more than 30 parts by weight, a satisfactory frictional wear characteristics cannot be obtained.

Furthermore, the lubricant may previously be mixed with the polyoxymethylene polymer or other resins as a master batch before the molding step of the resin composition.

The resin composition of the present invention may further contain (IV) a polyolefinic resin in addition to the components (I) and (II). The polyolefinic resin as the component (IV) includes, for example, homopolymers of olefinic monomers such as polyethylene, polypropylene, polybutylene, polyisobutylene, etc. and α-olefinic polymers such as ethylene-propylene copolymer, ethylene-butene copolymer, ethylene-octene copolymer, etc. These may be modified with unsaturated carboxylic acids such as maleic acid, nadic acid, etc., or acid anhydrides thereof.

The amount of the polyolefinic resin to be added is preferably 1–100 parts by weight, more preferably 2–80 parts by weight based on 100 parts by weight of the polyoxymethylene polymer.

The polyolefinic resin (IV) may be used together with the lubricant (III) in the polyolefinic resin composition of the present invention.

Next, description will be made of additives which can be further added to the polyoxymethylene resin composition of the present invention. In the present invention, when two or more calcium difatty acid salts having 12–22 carbon atoms are added in an amount of 0.01–0.2 part by weight based on 100 parts by weight in total of the essential components (I) and (II) and optionally the components (III) and/or (IV), frictional wear characteristics and vibration damping properties of the moldings obtained from the resin composition can further be markedly improved.

In the present invention, other additives can further be added, if necessary. They include, for example, antioxidants, hindered amines, polyamides, melamine, melamine derivatives, poly-β-alanine copolymer, ultraviolet absorbers, inorganic fillers such as glass fibers, talc, wollastonite and hydrotalcite, electrically conductive carbon black, pigments, crystal nucleating agents, release agents, antistatic agents, and the like. Particularly, it is preferred to add triethylene glycol-bis[3-(3-t-butyl-5-methyl-4-hydroxyphenyl) propionate] as the antioxidant in an amount of 0.1–1.0 part by weight based on 100 parts by weight in total of the essential components (I) and (II) and the optional components (III) and/or (IV).

As mentioned above, the moldings made from the resin composition of the present invention which contains a polyoxymethylene polymer and a specific thermoplastic elastomer can satisfy both the good frictional wear characteristics and the high vibration damping performance.

These moldings can be obtained by injection molding, gas-assist injection molding or extrusion molding and, if necessary, subjecting the products to a cutting operation. The shape of the moldings is not particularly limited, and those which have substantial vibration damping function are included in the moldings of the present invention.

The moldings of the present invention satisfy simultaneously the good frictional wear characteristics and high vibration damping properties and, hence, can be used as materials for vibration-proof sliding components and are especially useful as materials of gears of vibration-proof sliding components in the fields of precision machines, OA appliances, and automobiles. Specifically, they are used as mechanical working components, outsert molded resin components, chassis, trays and side plates, etc., and especially suitably used as working components such as gears, cams, sliders, levers, arms, clutches, joints, shafts, bearings, key stem, key tops, shutters, reels, etc.

DESCRIPTION OF PREFERRED EMBODIMENTS

The present invention will be explained in detail below, referring to the following Examples and Comparative Examples.

[Evaluation Method]

(1) Measurement of viscoelasticity of thermoplastic elastomer:

Viscoelasticity spectrum was measured by RHEOVIBRON (manufactured by Orientech Co., Ltd.) to obtain a main dispersion peak temperature in a tan δ curve (tan δ peak temperature)

(2) Microstructure:

Microstructure was determined by measuring NMR spectrum, and contents of 3,4-bonds and 1,2-bonds were calculated from the ratio of peaks of 3,4-bonds and 1,2-bonds of 4.8 ppm and 5.8 ppm and the peak of 1,4-bonds of 5.3 ppm.

(3) Frictional wear characteristics:

Spur gears with a pitch circle diameter of 60 mm, a module of 1, the number of gear teeth of 60, a pressure angle of 20°, a gear teeth width of 5 mm, a web thickness of 2 mm, a twisted angle of 0°, and a weight of about 10 g were molded using the pellets of Examples and Comparative Examples. They were left to stand for 24 hours at 23° C. and 50RH, and these were employed as gears for evaluation. Using a gear durability tester made by Toshiba Corp., the gear for evaluation was set to the driven side and a gear (having the same shape as of the gear for evaluation) made from Tenac-C4520, a commercially available polyacetal resin copolymer, was set to the driving side. The tester was continuously operated at 23° C. and 50RH for 96 hours with setting a revolution speed at the pitch circle to 0.5 m/s and a torque to 4.5 kgf-cm. Weight loss (mg) of both gears on the driving side and driven side was measured as a wear amount, and this wear amount was taken as frictional wear characteristic. That is, it can be judged that the smaller the wear amount is, the better the frictional wear characteristics are.

(4) Vibration damping properties:

Each of the pellets in Examples and Comparative Examples was dried at 80° C. for 3 hours and molded into a dumbbell test piece of 3.0 mm in thickness×13 mm in width×175 mm in length, using a 5-ounce molding machine (SH-75 manufactured by Sumitomo Heavy Industries, Ltd.) set at a cylinder temperature of 200° C. under the conditions of a mold temperature of 70° C., an injection time of 25 seconds and a cooling time of 15 seconds. This molded test piece was fixed at its one end in a room free from sound of footsteps, and the sound which was emitted when the root of the fixed end was struck by an impulse hammer was measured and the frequency response function between vibration force signals of the hammer and sound pressure signals of microphone was obtained by an acoustic analysis system manufactured by Ono Sokki Co., Ltd. The difference in sound pressure level between the second resonance peak and the second antiresonance peak of the frequency response function was measured. The smaller difference in sound pressure level means better vibration damping characteristics.

[The Components Used]

I. Polyoxymethylene polymers:

I-1: A biaxial paddle-type continuous polymerizer with a jacket through which a heating medium could be passed was adjusted to 80° C., and the following monomer components, polymerization catalyst and chain transfer agent were continuously fed thereto to carry out polymerization.

(Monomer components):

Trioxane containing 4 ppm of water and formic acid in total: 40 moles/hr, 1,3-dioxolane: 0.7 mole/hr.

(Polymerization catalyst):

Boron trifluoride di-n-butyl etherate dissolved in cyclohexane: $5 \times 10^{-5}$ mole based on 1 mole of trioxane.

(Chain transfer agent):

Methylal [$(CH_3O)_2CH_2$]: $2\times10^{-3}$ mole based on 1 mole of trioxane.

The polyoxymethylene copolymer discharged from the polymerizer was put into a 1% aqueous triethylamine solution to completely deactivate the polymerization catalyst. Then, the resulting polyoxymethylene copolymer was filtered off and washed, and triethyl(2-hydroxyethylammonium) formate as a quaternary ammonium compound was added to 1 part by weight of the filtered and washed crude polyoxymethylene copolymer so that the amount of the former was 20 ppm by weight in terms of nitrogen amount as defined in the aforementioned formula (5), followed by uniform mixing and drying at 120° C.

Then, to 100 parts by weight of the dried crude polyoxymethylene copolymer were added 0.3 part by weight of triethylene glycol-bis[3-(3-t-butyl-5-methyl-4-hydroxyphenyl)propionate] as an antioxidant, 0.02 part by weight of calcium stearate and 0.02 part by weight of calcium behenate, and the mixture was fed to a twin-screw extruder with a vent. If necessary, water and/or triethylamine were added to the molten polyoxymethylene copolymer in the extruder, and unstable terminal groups were decomposed at a setting temperature of 200° C. and a residence time in the extruder of 5 minutes.

The polyoxymethylene copolymer whose unstable terminal groups were decomposed was devolatized under a vent vacuum degree of 20 Torr, and extruded from the dice part of the extruder as a strand, followed by pelletizing.

I-2: A polyoxymethylene polymer was obtained in the same manner as in the above I-1, except that a biaxial paddle-type continuous polymerizer with a jacket through which a heating medium could be passed was adjusted to 80° C., and the following monomer components, polymerization catalyst and chain transfer agent were continuously fed thereto to carry out polymerization.

(Monomer components):

Trioxane containing 4 ppm of water and formic acid in total: 40 moles/hr.

1,3-dioxolane: 2 moles/hr.

(Polymerization catalyst):

Boron trifluoride di-n-butyl etherate dissolved in cyclohexane: $5\times10^{-5}$ mole based on 1 mole of trioxane.

(Chain transfer agent):

A hydrogenated polybutadiene having hydroxyl groups at both ends and represented by the following formula (7) (Mn=2330): $1\times10^{-3}$ mole based on 1 mole of trioxane.

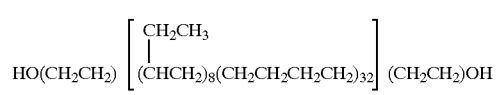

(7)

I-3: A 5-liter jacket type polymerizer with a stirring blade was adjusted to 60° C., and the following monomer component, polymerization catalyst and chain transfer agent were continuously fed thereto to carry out polymerization.

(Monomer component):

Substantially anhydrous formaldehyde: 35 moles/hr.

(Polymerization catalyst):

$1.0\times10^{-4}$ mole/L of tetrabutylammonium acetate: $0.143\times10^{-4}$ mole based on 1 mole of formaldehyde (Chain transfer agent):

Toluene containing $5.0\times10^{-3}$ mole/L of $C_{18}H_{37}O(CH_2CH_2O)_{40}H$ (an adduct of stearyl alcohol with ethylene oxide): 5 L/hr.

The resulting polymer was filtered off, and then acetic anhydride was added thereto so as to give a slurry concentration of 25 wt %, and esterification was carried out at 145° C. for 2 hours. Then, the product was filtered off, washed with acetone and dried at 120° C. to obtain a polyoxymethylene block polymer. To 100 parts by weight of this block polymer was added 0.25 part by weight of 2,2'-methylene-bis-(4-methyl-6-t-butylphenol), followed by feeding the mixture to a twin-screw extruder with a vent and melt kneading it in the extruder. Thereafter, the kneaded product was extruded from the dice part of the extruder as a strand, followed by pelletizing.

II. Thermoplastic elastomer and other polymers:

II-1: Styrene-vinylpolyisoprene-styrene copolymer (Trade name: "HYBRAR-5127" manufactured by Kuraray Co., Ltd.; tan δ peak temperature=20° C., total contents of 3,4-bonds and 1,2-bonds=70 mol %).

II-2: Styrene-hydrogenated vinylpolyisoprene-styrene copolymer (Trade name: "HYBRAR-7125" manufactured by Kuraray Co., Ltd.; tan δ peak temperature=−5° C., total contents of 3,4-bonds and 1,2-bonds=50 mol %).

II-3: Styrene-polyethylene.butylene-styrene copolymer (Trade name: "Tuftec H1041" manufactured by Asahi Kasei Co.; tan δ peak temperature=−50° C.).

II-4: Polystyrene (Trade name: "G8702" manufactured by Asahi Kasei Co.; tan δ peak temperature=100° C.)

III. Lubricant:

III-1: A silicone-grafted polyolefinic resin comprising a polyolefin on which a silicone compound was grafted which was obtained by melt kneading 30 g of an ethylene-methyl methacrylate copolymer containing 5% by weight of methyl methacrylate and having a melt index MI (ASTM-D1238-57T) of 5 g/10 min and 30 g of a silicone compound represented by the following formula (8), using a Labo-Plastomill (manufactured by Toyo Seiki K. K.) at a temperature of 180° C. and 60 rpm for 20 minutes:

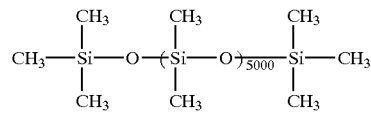

(8)

(where in the silicone compound of the formula (8), 5 moles of methyl groups are substituted with dimethylvinyl groups per 100 moles of silicone atoms).

The graft ratio of the silicone compound in this resin was 80 wt %, and content of free silicone compounds was 10 wt %.

III-2: Liquid ethylene-propylene copolymer (Mn=3000, trade name "LUCANT HC600" manufactured by Mitsui Chemical Co., Ltd.).

III-3: A master batch of polyacetal and a silicone comound (trade name "BY-27-006" manufactured by Toray.Dow-Corning Corp.).

IV. Polyolefinic resin:

IV-1: Maleic anhydride-modified ethylene-butene copolymer (trade name "N TAFMER MA8510" manufactured by Mitsui Chemical Co., Ltd.).

EXAMPLE 1

100 parts by weight of the polyoxymethylene polymer (I-1) and 20 parts by weight of the thermoplastic elastomer (II-1) were blended by a Henschel mixer. Then, the blend was extrusion-kneaded by a twin-screw extruder with a vent. The extruded resin composition was made into pellets by a strand cutter. The pellets were dried at 80° C. for 3 hours and then molded into a molding having a desired shape by an injection molding machine, and frictional wear characteristics and vibration damping properties of the molding were measured. The results are shown in Table 1.

EXAMPLES 2–8

The polyoxymethylene polymer and the thermoplastic elastomer at the composition as shown in Table 1 were blended by a Henschel mixer, and, then, pellets were prepared and molded into a molding in the same manner as in Example 1. The frictional wear characteristics and vibration damping properties of the molding were measured, and the results are shown in Table 1.

EXAMPLES 9–12

The polyoxymethylene polymer, the thermoplastic elastomer and the lubricant at the composition as shown in Table 1 were blended by a Henschel mixer, and, then, pellets were prepared and molded into a molding in the same manner as in Example 1. The frictional wear characteristics and vibration damping properties of the molding were measured, and the results are shown in Table 1.

EXAMPLE 13

The polyoxymethylene polymer, the thermoplastic elastomer, the lubricant and the polyolefinic resin at the composition as shown in Table 1 were blended by a Henschel mixer, and, then, pellets were prepared and molded into a molding in the same manner as in Example 1. The frictional wear characteristics and vibration damping properties of the molding were measured, and the results are shown in Table 1.

TABLE 1

| | Example | | | | | |
|---|---|---|---|---|---|---|
| | 1 | 2 | 3 | 4 | 5 | 6 |
| Composition (Part by weight) | | | | | | |
| I-1 | 100 | | | | | |
| I-2 | | 100 | | 100 | 100 | 100 |
| I-3 | | | 100 | | | |
| II-1 | 20 | 20 | 20 | 40 | 60 | 100 |
| II-2 | | | | | | |
| II-3 | | | | | | |
| II-4 | | | | | | |
| III-1 | | | | | | |
| III-2 | | | | | | |
| III-3 | | | | | | |
| IV-1 | | | | | | |
| Evaluation | | | | | | |
| Frictional wear characteristics (mg) | 67 | 44 | 88 | 46 | 49 | 50 |
| Vibration damping properties (dB) | 40 | 27 | 61 | 22 | 15 | 12 |

| | Example | | | | | | |
|---|---|---|---|---|---|---|---|
| | 7 | 8 | 9 | 10 | 11 | 12 | 13 |
| Composition (Part by weight) | | | | | | | |
| I-1 | 50 | 50 | 50 | 50 | 50 | 50 | 50 |
| I-2 | 50 | 50 | 50 | 50 | 50 | 50 | 50 |
| I-3 | | | | | | | |
| II-1 | 20 | | 20 | 20 | 20 | 20 | 20 |
| II-2 | | 20 | | | | | |
| II-3 | | | | | | | |
| II-4 | | | | | | | |
| III-1 | | | 3 | 15 | | | 3 |
| III-2 | | | | | 3 | | |
| III-3 | | | | | | 3 | |
| IV-1 | | | | | | | 20 |
| Evaluation | | | | | | | |
| Frictional wear characteristics (mg) | 40 | 43 | 21 | 20 | 32 | 31 | 23 |
| Vibration damping properties (dB) | 27 | 35 | 28 | 29 | 29 | 30 | 28 |

Comparative Examples 1–5

The components at the composition as shown in Table 2 were blended by a Henschel mixer, and, then, pellets were prepared and molded into a molding in the same manner as in Example 1. The frictional wear characteristics and vibration damping properties of the molding were measured, and the results are shown in Table 2.

TABLE 2

| | Comparative Example | | | | |
|---|---|---|---|---|---|
| | 1 | 2 | 3 | 4 | 5 |
| Composition (Part by weight) | | | | | |
| I-1 | 100 | | | 100 | 100 |
| I-2 | | 100 | | | |
| I-3 | | | 100 | | |
| II-1 | | | | | |
| II-2 | | | | | |
| II-3 | | | | 20 | |
| II-4 | | | | | 20 |
| III-1 | | | | | |
| III-2 | | | | | |
| III-3 | | | | | |
| IV-1 | | | | | |
| Evaluation | | | | | |
| Frictional wear characteristics (mg) | 101 | 100 | 105 | 128 | 126 |
| Vibration damping properties (dB) | 88 | 89 | 91 | 85 | 90 |

What is claimed is:

1. A polyoxymethylene resin composition which comprises (I) 100 parts by weight of a polyoxymethylene polymer and (II) 1–200 parts by weight of a thermoplastic elastomer having a main dispersion peak temperature of −30° C. to 50° C. in a tan δ curve obtained by the measurement of viscoelasticity and having a number average molecular weight of 10,000–500,000; wherein the polyoxymethylene polymer is a polyoxymethylene block polymer obtained by chain transferring a polymer containing at least one of hydroxyl group, carboxyl group, amino group, ester group and alkoxy group and having a number average molecular weight of not less than 400.

2. A polyoxymethylene resin composition according to claim 1, wherein tan δ of the thermoplastic elastomer which is obtained by the measurement of viscoelasticity at 23° C. is not less than 0.2.

3. A polyoxymethylene resin composition according to claim 1, wherein the polyoxymethylene polymer is a polyoxymethylene copolymer having oxymethylene groups as main recurring units and containing oxyalkylene groups having 2 or more carbon atoms in an amount of 0.1–5 mole % based on the total oxymethylene groups.

4. A polyoxymethylene resin composition according to claim 1, wherein the thermoplastic elastomer is a styrene elastomer.

5. A polyoxymethylene resin composition according to claim 4, wherein the styrene elastomer comprises a polymer segment (a) comprising a vinyl aromatic monomer having a number average molecular weight of not less than 2,500 and a polymer segment (b) comprising isoprene or isoprene-butadiene and containing not less than 20% of 3,4-bonds and 1,2-bonds.

6. A polyoxymethylene resin composition according to claim 5, wherein the styrene elastomer has at least two polymer segments (a).

7. A polyoxymethylene resin composition according to claim 1, wherein the polyoxymethylene polymer is an polyoxymethylene block copolymer represented by the following formula (1) which has a number average molecular weight of 10,000–500,000 and comprises a polyacetal segment and a hydrogenated polybutadiene segment hydroxyalkylated at both ends having a number average molecular weight of 500–10,000:

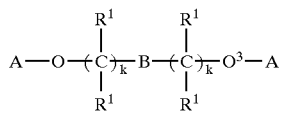 (1)

where A is a polyacetal copolymer residue and comprises 95–99.9 mole % of oxymethylene units and 0.1–5 mole % of oxyalkylene units represented by the following formula (2):

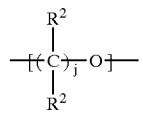 (2)

where $R^2$ is independently selected from the group consisting of hydrogen, an alkyl group, a substituted alkyl group, an aryl group and a substituted aryl group, and j is an integer selected from 2 to 6, the terminal group being represented by the following formula (3):

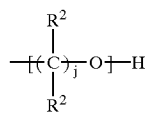 (3)

where $R^2$ and j have the same meanings as defined above, B is a hydrogenated polybutadiene having an iodine value of 20 g-$I_2$/100 g or less and containing 2–98 mole % of 1,2-bonds and 2–98 mole % of 1,4-bonds, said 1,2-bonds and 1,4-bonds being present either randomly or in block form, $R^1$ is independently selected from the group consisting of hydrogen, an alkyl group, a substituted alkyl group, an aryl group and a substituted aryl group, and k is an integer selected from 2 to 6 where two ks are the same or different from each other.

8. A polyoxymethylene resin composition according to claim 1, wherein the polyoxymethylene polymer is a polyoxymethylene polymer whose thermally unstable terminal groups are stabilized by treating with at least one quaternary ammonium compound represented by the following formula (4):

 (4)

where $R^3$, $R^4$, $R^5$ and $R^6$ independently represent an unsubstituted or substituted alkyl group having 1–30 carbon atoms; an aryl group having 6–20 carbon atoms; an aralkyl group consisting of an unsubstituted or substituted alkyl group having 1–30 carbon atoms with at least one aryl group having 6–20 carbon atoms as a substituent; or an alkylaryl group consisting of an aryl group having 6–20 carbon atoms with at least one unsubstituted or substituted alkyl group having 1–30 carbon atoms as a substituent; and the unsubstituted or substituted alkyl group is straight, branched or cyclic; hydrogen atom of the unsubstituted alkyl group, aryl group, aralkyl group and aralkylaryl group may be substituted by halogen; n is an integer of 1–3; and X represents a hydroxyl group or a residue of carboxylic acid having 1–20 carbon atoms, a hydroacid, an oxoacid, an inorganic thio acid or an organic thio acid having 1–20 carbon atoms.

9. A polyoxymethylene resin composition according to claim 1, which additionally contains (III) 0.1–30 parts by weight of a lubricant and/or (IV) 1–100 parts by weight of a polyolefinic resin based on 100 parts by weight of the polyoxymethylene polymer.

10. A polyoxymethylene resin composition according to claim 9, wherein the lubricant is a silicone-grafted polyolefinic resin.

11. A polyoxymethylene resin composition according to claim 10, wherein the polyolefinic resin of the silicone-grafted polyolefinic resin is at least one resin selected from the group consisting of a low density polyethylene, a linear low density polyethylene, an ethylene-vinyl acetate copolymer, an ethylene-methyl methacrylate copolymer and an ethylene-ethyl acrylate copolymer.

12. A polyoxymethylene resin composition according to claim 9, wherein the polyolefinic resin is a polyolefinic resin modified with an unsaturated carboxylic acid or an acid anhydride thereof.

13. A molding obtained by injection molding, gas-assist injection molding or extrusion molding the polyoxymethylene resin composition described in any one of claims 1–6 and 7–12, and, if necessary, subjecting the resulting molding to cutting process.

14. A molding according to claim 13, which is at least one member selected from the group consisting of a mechanical working component, an outsert molded resin component, a chassis, tray and a side plate.

15. A molding according to claim 14, wherein the mechanical working component is at least one member selected from the group consisting of gears, cams, sliders, levers, arms, clutches, joints, shafts, bearings, key stems, key tops, shutters and reels.

* * * * *